United States Patent [19]

Okamoto et al.

[11] Patent Number: 5,294,656
[45] Date of Patent: Mar. 15, 1994

[54] RUBBER MODIFIED STYRENE BASED RESIN COMPOSITION

[75] Inventors: Yasushi Okamoto, Chiba; Shuji Yoshimi, Ichihara; Yoshinori Kanno, Chiba, all of Japan

[73] Assignee: Sumitomo Chemical Company, Limited, Osaka, Japan

[21] Appl. No.: 26,590

[22] Filed: Mar. 5, 1993

[30] Foreign Application Priority Data

Mar. 10, 1992 [JP] Japan .................. 4-051364

[51] Int. Cl.$^5$ ............................... C08L 51/04
[52] U.S. Cl. ...................... 524/269; 524/504; 525/71; 525/72; 525/73; 525/902
[58] Field of Search ............. 525/70, 71, 73, 72, 525/902; 524/261, 269, 504, 515, 529

[56] References Cited

U.S. PATENT DOCUMENTS

| | | | |
|---|---|---|---|
| 3,686,356 | 8/1972 | Saam | 525/73 |
| 4,146,589 | 3/1979 | Dupre | 525/71 |
| 4,153,645 | 5/1979 | Lanza | 525/71 |
| 4,228,051 | 10/1980 | Sakano et al. | 525/70 |
| 4,493,922 | 1/1985 | Echte et al. | 525/71 |
| 4,990,569 | 2/1991 | Okamoto et al. | 525/232 |
| 4,994,515 | 2/1991 | Washiyama et al. | 525/73 |
| 5,039,714 | 8/1991 | Kasahara et al. | 525/100 |

FOREIGN PATENT DOCUMENTS

| | | |
|---|---|---|
| 0096447 | 12/1983 | European Pat. Off. . |
| 0337569 | 10/1989 | European Pat. Off. . |
| 2557575 | 7/1985 | France . |
| 63-26774 | 5/1988 | Japan . |
| 63-112646 | 5/1988 | Japan . |
| 141177 | 9/1988 | Japan . |
| 63-51459 | 10/1988 | Japan . |

OTHER PUBLICATIONS

Database WPIL, Week 8939, Nov. 22, 1989, Derwent Publications Ltd., London, GB; AN 89-282613 & JP-A-01 207 369 (Nippon Yuka Kogyo) Aug. 21, 1989.

*Primary Examiner*—James J. Seidleck
*Assistant Examiner*—Mark L. Warzel
*Attorney, Agent, or Firm*—Sughrue, Mion, Zinn, Macpeak & Seas

[57] ABSTRACT

A rubber modified styrene based resin composition which is excellent in the balance of impact strength and shapes appearance such as gloss and especially image clarity, and has a wide applicability in the field of housings for household electric apparatuses and the like requiring such a shapes appearance as having been difficult to achieve with conventional rubber modified polystyrenes (HIPSs), and which comprises a styrene based resin forming a matrix and particulate soft component containing rubbery elastomer dispersed in the matrix, wherein the soft component dispersed in the composition consists of a small-sized particulate component having a core/shell structure and an average particle size of 0.1 to 0.4 μm and a large-sized particulate component having a cell structure and an average particle size of 0.8 to 2.0 μm, a ratio by weight of the small-sized component to the large-sized component being in the range of 90:10 to 99:1, and the resin composition contains an amount of 0.01 to 0.5% by weight of methyl phenyl silicone oil.

9 Claims, No Drawings

RUBBER MODIFIED STYRENE BASED RESIN COMPOSITION

BACKGROUND OF THE INVENTION

1. Field of the Invention

The present invention relates to a rubber modified styrene based resin composition which is improved in a balance between impact strength and appearance of shaped articles such as gloss and image clarity.

2. Description of the Related Art

In order to improve the impact strength of hard brittle styrene based resins, it is well known that a rubbery elastomer is blended with a styrene based polymer, or that a rubbery elastomer is dissolved in a styrene monomer, followed by polymerization to prepare a modified styrene based resin composition. However, the styrene based resins are disadvantageous in that they are poor in a balance between impact strength and appearance of shaped articles compared to the ABS resins which are widely used as housing materials for household electric apparatuses and office systems.

A method for improving the appearance (gloss and image clarity) of the shaped articles by reducing the particle size of the rubber has been heretofore investigated. However, the reduction in particle size to an extent as achieving a satisfactory gloss leads to a great reduction in impact strength, Thus, no resin has been obtained which is good in the balance.

For the purpose of improvement in the balance between impact strength and gloss, a composition comprising a dispersion of a smaller size particulate rubber component and a larger size particulate rubber component is disclosed in prior art publications such as U.S. Pat. No. 4,493,922, Japanese Patent Kokoku (Post-Exam. Publication) No. Hei 1-41177, Japanese Patent KOKAI (Laid-open) No. Hei 1-261444, and Japanese Patent KOKAI (Laid-open) No. Sho 63-112646. If the larger particle size rubber component has a particle size of 2 $\mu$m or more, the appearance of the flow ends of the injected molded articles such as gloss and especially image clarity may degrade, while if it has a particle size of less than 2 $\mu$m, insufficient impact strength is attained. Either case can not achieve a composition having a combination of fully satisfactory impact strength and appearance of the shaped articles.

A composition comprising a rubber modified styrene based resin, to which an organic polysiloxane is added for improving the impact strength is disclosed in prior art publications such as Japanese Patent Kokoku (Post-Exam. Publication) No. Sho 63-26774 and Japanese Patent Kokoku (Post-Exam. Publication) No. Sho 63-51459, though a composition comprising with smaller size rubber particles of less than 0.5 $\mu$m could not achieve satisfactory impact strength.

As used here, the term "image clarity" is a measure of goodness of the appearance of the shaped articles. In addition of the image clarity, a degree of gloss is also known as a measure of goodness of the appearance of the shaped articles, though the image clarity allows for a higher level of evaluation in quality than the gloss.

SUMMARY OF THE INVENTION

It is an object of the present invention to provide a rubber modified styrene based resin composition which is improved in the balance between impact strength and appearance of the shaped articles by achieving less reduction in impact strength when the appearance of the shaped articles such as gloss and image clarity is improved.

As a result of our intensive research, we have found that the aforementioned problems can be overcome by specifying a soft component comprising a rubbery elastomer dispersed as a toughening agent in a matrix for particle morphology, average particle size and particle size distribution, and incorporating methyl phenyl silicone oil as a specific additive. The present invention is based on the findings as above.

That is, the present invention is a rubber modified styrene based resin composition comprising a styrene based resin forming a matrix and a rubbery elastomer-containing soft component dispersed in the form of particles in the matrix, wherein the soft component dispersed in the composition consists of a small-sized particulate component having a core/shell structure and an average particle size of 0.1 to 0.4 $\mu$m and a large-sized particulate component having a cell structure and an average particle size of 0.8 to 2.0 $\mu$m, a ratio by weight of the small-sized component to the large-sized component being in the range of 90:10 to 99:1, and the resin composition contains an amount of 0.01 to 0.5% by weight of methyl phenyl silicone oil.

In order to achieve the object of the present invention, it is necessary to specify the soft component for particle morphology, average particle size and particle size distribution (a ratio of the smaller size particulate component to the larger size particulate component), and to incorporate methyl phenyl silicone oil as an additive. Deficiency of any one of these requirements will fail to achieve the object of the present invention.

The present invention will be further described in detail hereunder.

The rubber modified styrene based resin used in the present invention may be produced by dissolving a rubbery elastomer into an aromatic monovinyl monomer, followed by a mass polymerization or mass-suspension two steps polymerization.

As aromatic monovinyl monomers, styrene is popular, though alkyl substituted styrenes such as o-methylstyrene, m-methylstyrene, p-methylstyrene and the like may be used.

As rubber elastomers, polybutadienes, styrene-butadiene copolymers, ethylene-propylene-non-conjugated diene terpolymers may be used with polybutadienes and styrene-butadiene copolymers being preferred. The polybutadienes to be used include both a high cis-polybutadiene having a higher content of cis type structures and a low cis-polybutadiene having a lower one.

It is known that the structure of the soft component in the rubber modified styrene based resin composition may be classified into a core/shell structure group and a cell structure group. Core/shell structure is called a capsule structure or single occlusion structure, which is constituted from a core part of styrene resin and a shell part of rubber elastomer. The cell structure is also called a salami structure where discrete small particles of the styrene based resin are distributed in the rubbery elastomer phase. These structures of the soft component can be determined by observations with a transmission electron microscope.

The soft component having the core/shell structure (small size component) specified in the present invention may be obtained by dissolving a styrene-butadiene copolymer into an aromatic vinyl monomer, followed by polymerization with stirring. The particle size of the soft component can be varied as desired depending upon a stirring rate, polymerization temperature, ratio of styrene/butadiene in the styrene-butadiene copolymer, and an amount of butadiene rubber, if necessary, as well as a sort and a concentration of polymerization initiators.

The soft component having the cell structure (large-sized component) specified in the present invention may be obtained by dissolving polybutadiene into an aromatic vinyl monomer, followed by polymerization with stirring. Its particle size can be varied as desired depending upon a structure of the polybutadiene, a stirring rate, a sort and a concentration of polymerization initiators and the like.

A ratio of the small-sized component to the large-sized component specified in the soft component according to the present invention may be controlled by mixing a polymerization solution containing the small-sized component with a polymerization solution containing the large-sized component in a predetermined ratio and then accomplishing the polymerization, though conveniently it may be controlled by mixing with an extruder a rubber-modified styrene resin containing the small-sized component and a rubber-modified styrene resin containing the large-sized component in a predetermined ratio.

The small-sized component of the core/shell structure in the present invention has an average particle size of 0.1 to 0.4 $\mu$m, preferably 0.2 to 0.3 $\mu$m.

The average particle size of the small-sized component less than 0.1 $\mu$m leads to a reduction in impact strength, and that over 0.4 $\mu$m does to the unattainment of good balance due to degradation of shapes appearance such as gloss and image clarity.

The large-sized component of the cell structure has an average particle size of 0.8 to 2.0 $\mu$m, preferably 1.0 to 1.5 $\mu$m. The average particle size of the large-sized component less than 0.8 $\mu$m leads to a reduction in impact strength, and that over 0.2 $\mu$m does to the unattainment of good balance due to degradation of shapes appearance such as gloss and image clarity.

The average particle sizes as used here are those which were determined by taking transmission electron micrographs of ultra-thin specimens of the rubber modified styrene based resin and measuring the particle size distribution of 500 soft component particles shown in the photographs.

The average particle size is calculated by the following formula:

$$\text{Average particle size} = \frac{\Sigma\ n_1\ D_1^2}{\Sigma\ n_1\ D_1}$$

where $n_1$ is a number of the soft component particles having a size of $D_1$.

A ratio by weight of the small-sized component to the large-sized component in the present invention is required to be in the range of 90:10 to 99:1, preferably 95:5 to 98:2.

The amount of the large-sized component in the range by weight of above 10 causes a reduction in shapes appearance such as gloss and image clarity, and that below 1 causes a reduction in impact strength to attain no good balance. Specifically, when the weight ratio is in the range of 95:5 to 98:2, the most excellent image clarity can be achieved, and therefore, such range is preferred.

The amount of each particulate component as used here refers to the amount of insolubles in the rubber modified styrene based resin composition in a mixed solvent of methyl ethyl ketone/methanol, 10/1 by volume.

The methyl phenyl silicone oil to be used in the present invention is a polysiloxane having a methyl group and a phenyl group. The use of other organic polysiloxanes such as dimethyl polysiloxanes having only methyl groups than the methyl phenyl silicone oil can not yield a satisfactorily balanced composition because of less enhancement of impact strength.

The methyl phenyl silicone oil to be used in the present invention has preferably a viscosity in the range of 100 to 10000 cSt at 25° C. and preferably an index of refraction in the range of 1.410 to 1.500, without being limited thereto specifically.

The content of methyl phenyl silicone oil in the resin composition is in the range of 0.01 to 0.5% by weight, preferably 0.05 to 0.2% by weight. The content less than 0.01% by weight leads to an insufficient effect of improving the impact strength, while the content over 0.5 % by weight degrades undesirably a secondary processability such as printability on the surface of the shapes.

A process of the addition of methyl phenyl silicone oil into the resin composition is not critical, but the addition may be effected at the time of polymerization of the rubber modified styrene based resin, or it may be conducted with an extruder.

To the rubber modified styrene based resin of the present invention, there may added a coloring agent, mold release agent, sliding agent, plasticizer, antistatic agent and the like, if necessary.

DESCRIPTION OF PREFERRED EMBODIMENTS

The present invention will be illustrated with reference to the following Examples, without limiting thereto.

Some physical properties were determined by the following procedures:
(1) Izod impact strength (notched)

A specimen of 6.4 mm in thickness was made by injection molding, and measured according to ASTM D256.
(2) Gloss A flat plate of 90 mm×150 mm×2 mm thick was made by injection molding and a degree of gloss at 45° of the flow ends according to JIS K7105.
(3) Image clarity The image clarity at the position where the gloss measurement was performed was evaluated according to JIS K7105 with a Model ICM-1DP, an apparatus for measuring the image clarity, available from SUGA SHIKENKI Co. Ltd. The evaluated values for optical comb of 2.0 mm width were employed as the image clarity.

EXAMPLES 1 TO 5 AND COMPARATIVE EXAMPLES 1 TO 7

To rubber modified polystyrenes (referred to as HIPS) indicated as A to E in Table 1, there was incorporated a silicone oil in the proportions indicated in Tables 2 to 3 and melt kneaded with an extruder. The resultant mixture was injection-molded to produce a sample, which was determined for physical properties. The results are shown in Table 4.

TABLE 1

| HIPS name | A | B | C | D | E |
|---|---|---|---|---|---|
| Type of soft component | Core/Shell | Cell | Cell | Cell | Cell |
| Average particle size (μm) | 0.2 | 0.6 | 0.9 | 1.2 | 2.3 |
| Content of soft component (% by weight) | 24.4 | 14.3 | 15.2 | 16.1 | 12.8 |

The HIPSs indicated as A to E in Table 1 were prepared in the following procedure:

HIPS-A: Styrene was polymerized in the presence of styrene-butadiene block copolymer to produce a HIPS sample containing a core/shell type soft component having an average particle size of 0.2 μm.

HIPS-B-E: Styrene was polymerized in the presence of polybutadiene to produce a HIPS sample containing a shell type soft component having an average particle size of 0.6, 0.9, 1.2, or 2.3 μm.

TABLE 2

Formulation (1)

| | HIPS | | Soft component | | | Silicone oil | |
|---|---|---|---|---|---|---|---|
| | Type | Proportion incorporated | Type | Particle size (μm) | Proportion incorporated | Type | Amount (wt. %) |
| Comp. Example 1 | A | 100 | Core/shell | 0.2 | 100 | A | 0.1 |
| Comp. Example 2 | A | 90 | Core/shell | 0.2 | 93.9 | A | 0.1 |
| | B | 10 | Cell | 0.6 | 6.1 | | |
| Example 1 | A | 90 | Core/shell | 0.2 | 93.5 | A | 0.1 |
| | C | 10 | Cell | 0.9 | 6.5 | | |
| Example 2 | A | 95 | Core/shell | 0.2 | 96.6 | A | 0.1 |
| | D | 5 | Cell | 1.2 | 3.4 | | |
| Example 3 | A | 95 | Core/shell | 0.2 | 96.6 | A | 0.2 |
| | D | 5 | Cell | 1.2 | 3.4 | | |
| Example 4 | A | 95 | Core/shell | 0.2 | 96.6 | A | 0.05 |
| | D | 5 | Cell | 1.2 | 3.4 | | |

TABLE 3

Formulation (2)

| | HIPS | | Soft component | | | Silicone oil | |
|---|---|---|---|---|---|---|---|
| | Type | Proportion incorporated | Type | Particle size (μm) | Proportion incorporated | Type | Amount (wt. %) |
| Comp. Example 3 | A | 95 | Core/shell | 0.2 | 96.6 | — | — |
| | D | 5 | Cell | 1.2 | 3.4 | | |
| Comp. Example 4 | A | 95 | Core/shell | 0.2 | 96.6 | B | 0.1 |
| | D | 5 | Cell | 1.2 | 3.4 | | |
| Example 5 | A | 90 | Core/shell | 0.2 | 93.2 | A | 0.1 |
| | D | 10 | Cell | 1.2 | 6.8 | | |
| Comp. Example 5 | A | 80 | Core/shell | 0.2 | 85.8 | A | 0.1 |
| | D | 20 | Cell | 1.2 | 14.2 | | |
| Comp. Example 6 | A | 90 | Core/shell | 0.2 | 94.5 | A | 0.1 |
| | E | 10 | Cell | 2.3 | 5.5 | | |
| Comp. Example 7 | B | 95 | Cell | 0.6 | 94.4 | A | 0.1 |
| | D | 5 | Cell | 1.2 | 5.6 | | |

With respect to the silicone oils, A is a methyl phenyl silicone oil having a viscosity of 500 cSt. and an index of refraction of 1.425, SH 510, available from Tore-Dow Corning Silicone Co. Ltd., and B is a dimethyl silicone oil having a viscosity of 1000 cSt., and an index of refraction of 1.403, SH 200, available from Tore-Dow Corning Silicone Co. Ltd.

TABLE 4

| | Result of Evaluation | | |
|---|---|---|---|
| | Impact strength (kgcm/cm) | Gloss (%) | Image clarity (%) |
| Comp. Example 1 | 6.0 | 100 | 91 |
| Comp. Example 2 | 6.4 | 99 | 85 |
| Example 1 | 8.7 | 98 | 81 |
| Example 2 | 8.8 | 99 | 85 |
| Example 3 | 9.0 | 99 | 85 |
| Example 4 | 8.1 | 99 | 86 |
| Comp. Example 3 | 6.3 | 99 | 86 |
| Comp. Example 4 | 7.1 | 99 | 85 |
| Example 5 | 9.1 | 97 | 80 |
| Comp. Example 5 | 8.8 | 92 | 70 |
| Comp. Example 6 | 9.2 | 96 | 73 |
| Comp. Example 7 | 7.4 | 83 | 76 |

As evident from comparison of Comparative Example 2, Examples 1 and 2, and Comparative Example 6, when the large-sized component has an average particle size of less than 0.8 μm, the impact strength is inferior, while an average particle size over 2.0 μm can not yield any composition having a combination of satisfactory physical properties due to inferior image clarity.

Moreover, as can be seen from comparison of Comparative Example 1, Examples 2 and 5, and Comparative Example 5, when the ratio by weight of the small-sized component to the large-sized component is outside the range defined in the present invention, that is, the large-sized component is less than 1, the impact strength is inferior, while the large-sized component is above 10 can not yield any composition having a combination of satisfactory physical properties due to inferior gloss and image clarity.

Furthermore, as seen from comparison of Example 2 with Comparative Example 7, with the small-sized component having a particle size and a type other than those required in the present invention, any composition having a combination of satisfactory physical properties can not be obtained.

Furthermore, comparison of Example 2 with Comparative Examples 3 and 4 indicates clearly that when no methyl phenyl silicone oil is used, or other dimethyl silicone oil that defined in the present invention, only a composition being inferior in impact strength is obtained.

The composition of the present invention is excellent in impact strength, gloss and image clarity, while those not meeting the requirements of the present invention are inferior in the physical balance as evident from the aforementioned Examples and Comparative Examples.

The resin composition according to the present invention is excellent in the balance of impact strength and shapes appearance such as gloss and especially image clarity, so that it has a wide applicability in the field of housings for domestic electric apparatuses and the like requiring such a shapes appearance as having been difficult to achieve with conventional rubber modified polystyrenes (HIPSs).

What is claimed is:

1. A rubber modified styrene based resin composition comprising a styrene based resin forming a matrix and a rubbery elastomer-containing soft component dispersed in the form of particles in the matrix, wherein said soft component dispersed in the composition consists of a small-sized particulate component having a core/shell structure and an average particle size of 0.1 to 0.4 $\mu$m and a large-sized particulate component having a cell structure and an average particle size of 0.8 to 2.0 $\mu$m, wherein a ratio by weight of said small-sized component to said large-sized component is in the range of 90:10 to 99:1, and said resin composition contains 0.01 to 0.5% by weight of methyl phenyl silicone oil, wherein said methyl phenyl silicone oil has an index of refraction in the range of 1.410 to 1.500.

2. The rubber modified styrene based resin composition according to claim 1, in which said ratio of said small-sized particulate component to said large-sized particulate component is in the range of 95:5 to 98:2.

3. The rubber modified styrene based resin composition according to claim 1, in which the average particle size of said small-sized particulate component is in the range of 0.2 to 0.3 $\mu$m.

4. The rubber modified styrene based resin composition according to claim 1, in which the average particle size of said large-sized particulate component is in the range of 1.0 to 1.5 $\mu$m.

5. The rubber modified styrene based resin composition according to claim 1, in which said methyl phenyl silicone oil has a viscosity in the range of 100 to 10000 cSt. at 25° C.

6. The rubber modified styrene based resin composition according to claim 1, in which the content of said methyl phenyl silicone oil is in the range of 0.05 to 0.2% by weight.

7. The rubber modified styrene based resin composition according to claim 1, in which said rubbery elastomer is selected from the group consisting of polybutadienes, styrene-butadiene copolymers, and ethylenepropylene-non-conjugated dione terpolymers.

8. The rubber modified styrene based resin composition according to claim 1, in which said composition is produced by dissolving the rubbery elastomer into a aromatic monovinyl monomer, followed by mass polymerization or mass-suspension.

9. The rubber modified styrene based resin composition according to claim 8, in which said aromatic monovinyl monomer is selected from the group consisting of styrene, o-methylstyrene, m-methylstyrene and p-methylstyrene.

* * * * *